United States Patent
Mayville et al.

(10) Patent No.: US 9,051,226 B2
(45) Date of Patent: Jun. 9, 2015

(54) GAS GENERATING SYSTEM

(75) Inventors: Brian A. Mayville, Troy, MI (US); Dale E. Tauchen, Clinton Township, MI (US); Joshua D. VanHooser, Waterford, MI (US)

(73) Assignee: TK Holdings Inc., Armada, MI (US)

( * ) Notice: Subject to any disclaimer, the term of this patent is extended or adjusted under 35 U.S.C. 154(b) by 21 days.

(21) Appl. No.: 13/304,302

(22) Filed: Nov. 23, 2011

(65) Prior Publication Data
US 2012/0125219 A1 May 24, 2012

Related U.S. Application Data

(60) Provisional application No. 61/417,138, filed on Nov. 24, 2010.

(51) Int. Cl.
| | |
|---|---|
| *B60R 21/26* | (2011.01) |
| *C06D 5/00* | (2006.01) |
| *B01J 7/00* | (2006.01) |
| *C06D 5/06* | (2006.01) |
| *B60R 21/264* | (2006.01) |
| *C06C 9/00* | (2006.01) |

(52) U.S. Cl.
CPC .............. *C06D 5/06* (2013.01); *B60R 21/2646* (2013.01); *B60R 21/264* (2013.01); *C06D 5/00* (2013.01); *B01J 7/00* (2013.01); *B60R 21/26* (2013.01); *B60R 21/2644* (2013.01); *B60R 2021/26011* (2013.01); *B60R 2021/2607* (2013.01); *B60R 2021/2642* (2013.01); *C06C 9/00* (2013.01)

(58) Field of Classification Search
CPC .. B60R 21/26; B60R 21/264; B60R 21/2642; B60R 21/2644; B60R 21/2646; C06D 5/00; B01J 7/00

USPC ................. 102/530, 531; 280/736, 741
See application file for complete search history.

(56) References Cited

U.S. PATENT DOCUMENTS

| | | | | |
|---|---|---|---|---|
| 4,249,673 | A | * | 2/1981 | Katoh et al. ................. 222/3 |
| 5,730,462 | A | * | 3/1998 | Jackson et al. .............. 280/741 |
| 6,168,200 | B1 | * | 1/2001 | Greist et al. ................. 280/736 |
| 6,464,254 | B2 | * | 10/2002 | Chikaraishi et al. .......... 280/741 |
| 6,474,685 | B1 | * | 11/2002 | Meixner et al. .............. 280/741 |
| 6,752,421 | B2 | * | 6/2004 | Khandhadia et al. ......... 280/741 |
| 6,886,469 | B2 | * | 5/2005 | Shilliday et al. ............. 102/530 |
| 7,137,341 | B2 | * | 11/2006 | Shilliday et al. ............. 102/530 |
| 7,363,863 | B2 | * | 4/2008 | Engler et al. ................. 102/530 |
| 7,712,780 | B2 | * | 5/2010 | Pack et al. ................... 280/741 |
| 7,802,812 | B2 | * | 9/2010 | Mayville et al. ............. 280/741 |
| 8,047,567 | B2 | * | 11/2011 | Zengerle et al. ............. 280/736 |
| 8,453,575 | B2 | * | 6/2013 | Humbert et al. ............. 102/530 |
| 8,573,644 | B1 | * | 11/2013 | Mayville et al. ............. 280/741 |
| 8,657,974 | B1 | * | 2/2014 | Mayville et al. ............... 149/2 |
| 8,783,188 | B1 | * | 7/2014 | Mayville et al. ............. 102/530 |
| 2001/0026064 | A1 | * | 10/2001 | Bergmann et al. ........... 280/737 |
| 2010/0045009 | A1 | * | 2/2010 | Kelley et al. ................. 280/741 |
| 2012/0125219 | A1 | * | 5/2012 | Mayville et al. ............. 102/530 |

* cited by examiner

*Primary Examiner* — James S Bergin
(74) *Attorney, Agent, or Firm* — L.C. Begin & Associates, PLLC.

(57) ABSTRACT

A gas generating system includes a housing, a quantity of gas generant material positioned within the housing, and a quantity of booster material positioned in the housing spaced apart from the gas generant. A movable first screen is positioned in the housing such that the booster material is on a first side of the screen and the gas generant material is on a second side of the screen opposite the first side of the screen. The screen is structured to enable fluid communication between the first and second sides of the screen.

20 Claims, 3 Drawing Sheets

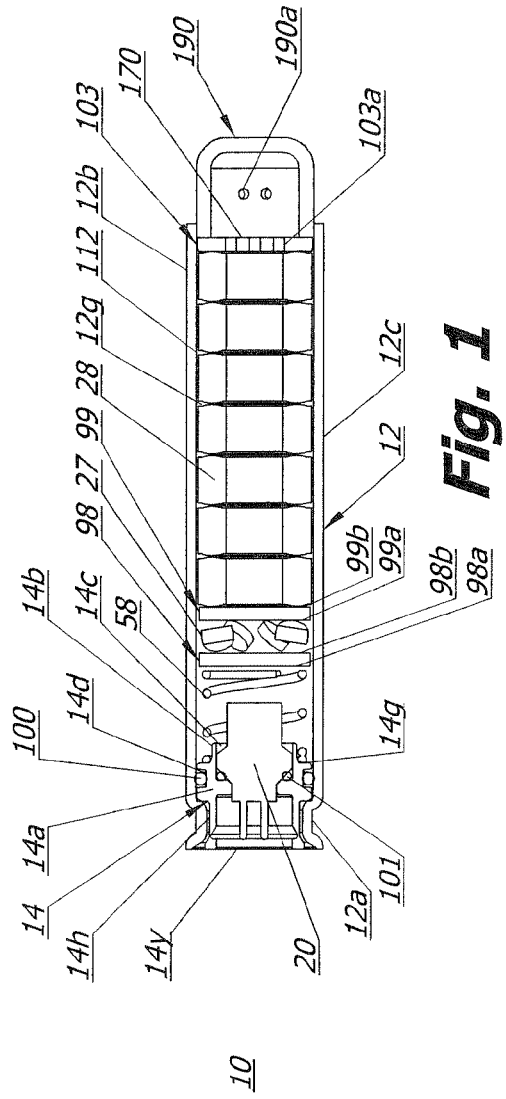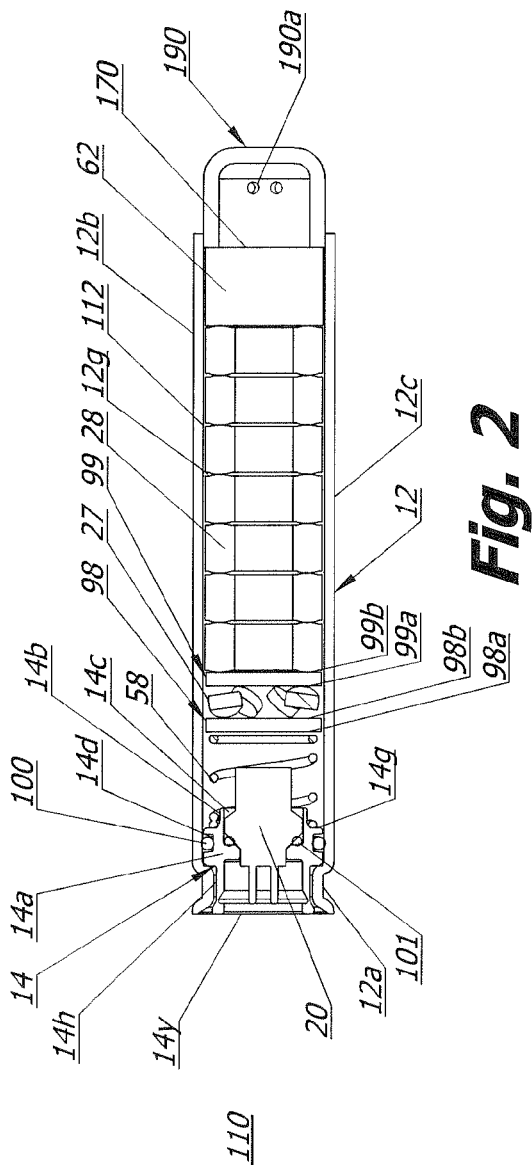

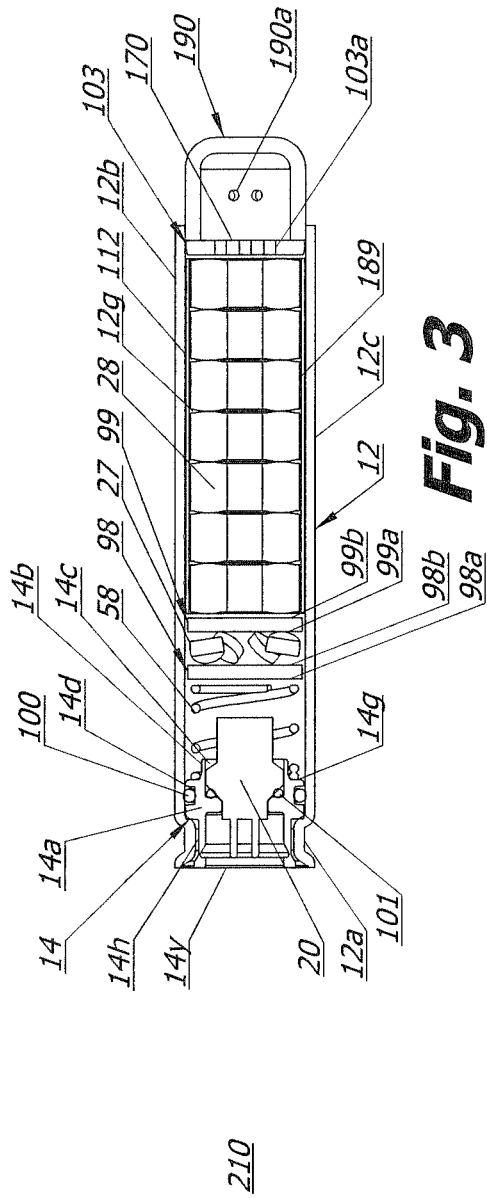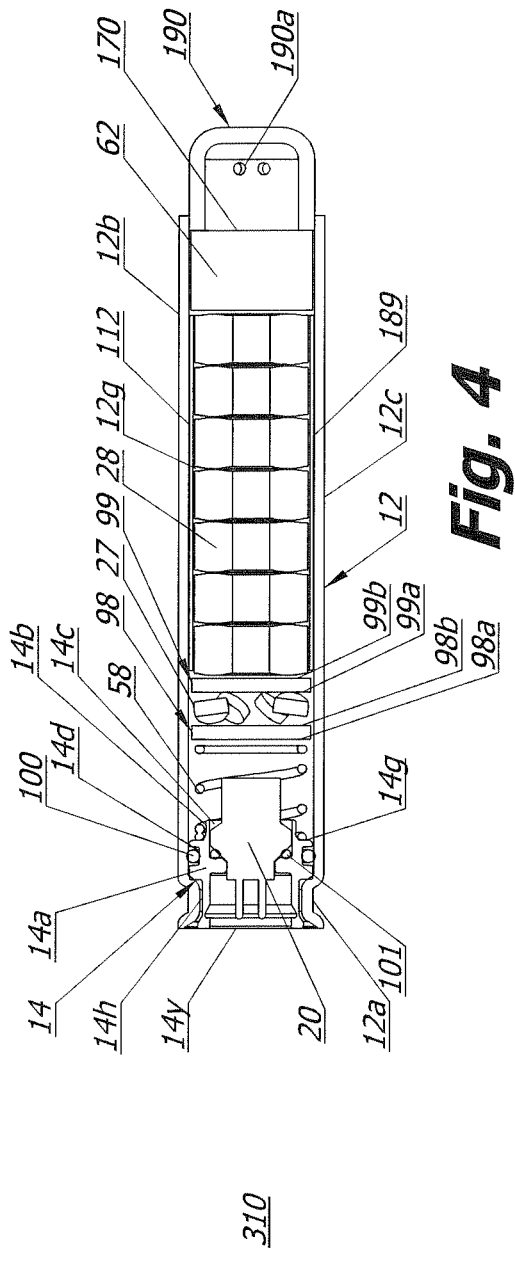

GAS GENERATING SYSTEM

CROSS REFERENCE TO RELATED APPLICATIONS

This application claims the benefit of U.S. Provisional Application No. 61/417,138, filed on Nov. 24, 2010, the disclosure of which is incorporated by reference herein.

BACKGROUND OF THE INVENTION

The present invention relates to gas generating systems for generating pressurized gases used to inflate one or more inflatable devices.

An ongoing challenge in the design of vehicle occupant protection systems is to reduce the cost and complexity of the system while meeting operational requirements. In protection systems utilizing gas generating systems or inflators to actuate inflatable elements of the protection system, it may be desirable for the gas generating system design to be flexible enough to enable the amount of gas generant and/or booster material incorporated to be varied according to the requirements of a particular application. It may also be desirable to enable incorporation of a means for shielding combustible materials in the gas generating system from excessive heat produced by a flame exterior of and impinging on the gas generating system housing. Thus, a need exists for gas generating system designs that meet these design goals.

SUMMARY OF THE INVENTION

In one aspect of the embodiments of the present invention, a gas generating system is provided including a housing, a quantity of gas generant material positioned within the housing, and a quantity of booster material positioned in the housing spaced apart from the gas generant. A movable first screen is positioned in the housing such that the booster material is on a first side of the screen and the gas generant material is on a second side of the screen opposite the first side of the screen. The screen is structure to enable fluid communication between the first and second sides of the screen.

In another aspect of the embodiments of the present invention, a gas generating system is provided including a housing, a quantity of gas generant material positioned within the housing, and a thermally-insulating sleeve enclosing the gas generant material therein. A movable first screen is biased against the gas generant material. The first screen is structured to enable fluid communication therethrough. A quantity of booster material is biased against the first screen opposite the gas generant material.

BRIEF DESCRIPTION OF THE DRAWINGS

In the drawings illustrating embodiments of the present invention:

FIG. 1 is a cross-sectional side view of a gas generating system in accordance with one embodiment of the present invention.

FIG. 2 is a cross-sectional side view of a gas generating system in accordance with another embodiment of the present invention.

FIG. 3 is a cross-sectional side view of a gas generating system in accordance with another embodiment of the present invention.

FIG. 4 is a cross-sectional side view of a gas generating system in accordance with another embodiment of the present invention.

DETAILED DESCRIPTION

Figure 5:
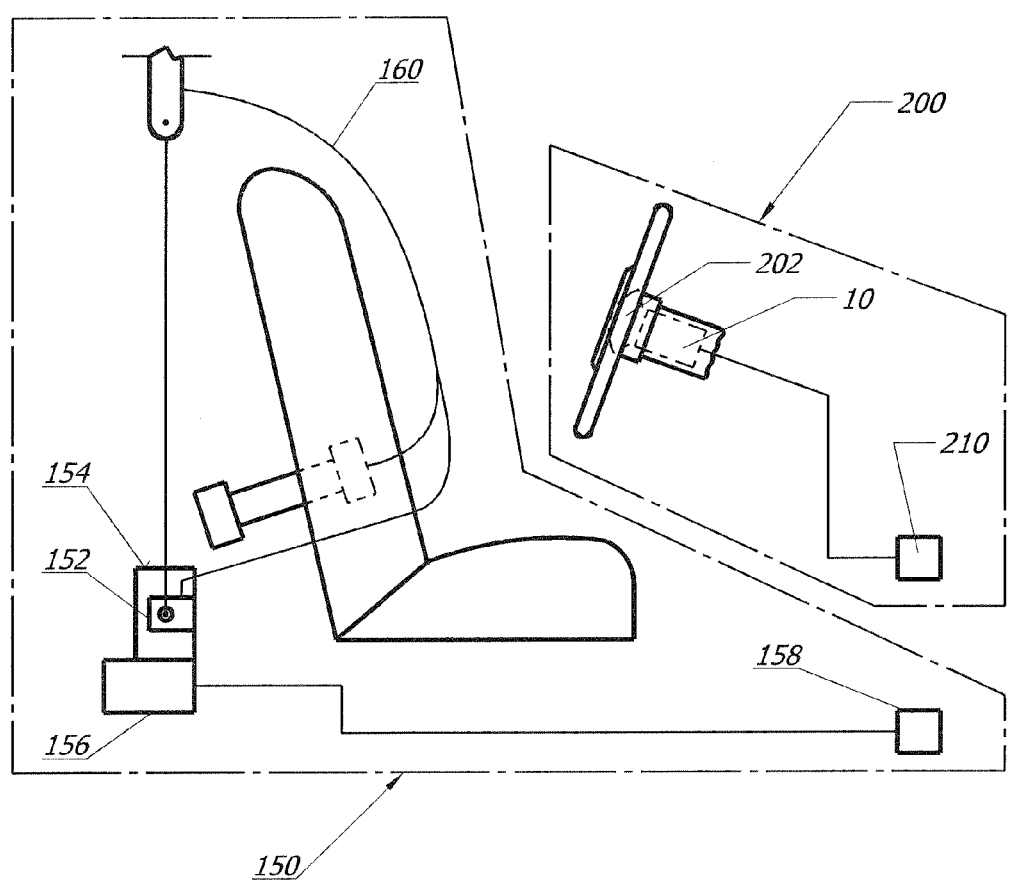
FIG. 5 is a schematic representation of an exemplary vehicle occupant protection system incorporating a gas generating system in accordance with an embodiment of the present invention.

In the descriptions set forth herein, like reference numerals refer to like elements of embodiments of the present invention.

Referring to FIGS. 1-4, embodiments 10, 110, 210, 310 of a gas generating system include a substantially cylindrical housing 12 having a first end 12a, a second end 12b opposite the first end, and a wall 12c extending between the ends to define a housing interior cavity 112. A portion of cavity 112 defines a combustion chamber 12g for a combustible gas generant material 28 described in greater detail below. Housing 12 is made from a metal or metal alloy and may be a cast, stamped, deep-drawn, extruded, or otherwise metal-formed.

Housing first end 12a is configured for receiving a portion of a suitable initiator 20 (described below) therein, and is also configured to aid in retaining the initiator in place within the housing 12 once the initiator has been positioned. Housing end 12a may be structured so as to support and maintain initiator 20 in position during operation of the gas generating system. In the embodiments shown in FIGS. 1-4, the housing end 12a is crimped over (or otherwise configured to engage) a first end closure 14 (described below) in which the initiator is secured.

Referring to FIGS. 1 and 2, first end closure 14 includes a base portion 14a and a wall 14b extending from the base portion to form a cavity 14c configured for receiving initiator 20 therein. A groove 14d is formed along an exterior surface of the end closure for mounting of a compressive seal 100 (for example, an O-ring, gasket, or other suitable seal) therein. Seal 100 forms a substantially gas-tight seal between the end closure and the housing 12. Cavity 14c may be configured to provide a seating surface(s) for another compressive seal 101 which is positioned along the seating surface and compressed between the seating surface and the initiator 20 when the initiator is secured within cavity 14c.

End closure 14 may also include a first shoulder 14g projecting outwardly from wall 14b to provide a bearing surface for engaging a resilient member 58 (described below). First end closure 14 may also include a recess 14h configured to receive therein a portion of housing 12 which is crimped or otherwise formed engage the end closure to help retain the end closure within (or attached to) the housing. An end portion 14y of the first end closure 14 may be configured to provide an interface mateable with a complementary connector of a wiring harness or other suitable initiator activation signal transmission medium. End closure 14 may be formed by stamping, casting, molding or any other suitable method and may be made from carbon steel, stainless steel, or any other suitable material.

Referring again to FIGS. 1-4, an initiator 20 is positioned and secured in end closure 14 so as to provide fluid communication between the initiator and a booster material 27 (described below) and/or an auto-ignition material (not shown) positioned in housing. Initiator 20 is also positioned and secured in housing 12 so as to provide fluid communication between the initiator and resilient member 58. Initiator 20 may be fabricated as known in the art, and initiators suitable for the applications described herein are commercially available from any of a variety of vendors. One exemplary initiator construction suitable for the applications described herein is disclosed in U.S. Pat. No. 6,009,809, herein incorporated by reference.

Referring again to FIGS. 1-4, a resilient member 58 abuts both first end closure 14 and a porous filter or screen 98 (described below) for pressing the screen 98 against a quantity of booster material 27 (described below) spaced apart from the main gas generant material 28. This enables flexible positioning of the movable screen 98, permitting the amount of booster material and/or gas generant material to be varied according to the requirements of a particular application while helping to immobilize the booster and gas generant materials and cushion these materials against vibration and impact. The structure of resilient member 58 also biases the screen 98 against the booster material 27 while enabling fluid communication (through the porous screen 98) between initiator 20 and any auto-ignition, booster, and/or gas generant material positioned in the housing interior cavity 112. In one embodiment, resilient member 58 is in the form of a conventional coil spring. However, the resilient member may have any structure suitable for the purposes described herein. Resilient member 58 may be formed from a metallic material, ceramic fiber material, or from any other material suitable for the purposes described herein.

In the embodiments shown in FIGS. 1-4, screen 98 is movable within housing 12 and is positioned between end closure 14 and booster material 27 and is biased against the booster material by resilient member 58. Screen 98 has a first side or face 98a, a second side or face 98b opposite the first side 98a, and a body 98c between the first and second sides 98a and 98b. Screen 98 is structured to enable fluid communication between the first and second sides of the screen. This structure enables initiator-generated combustion products to pass through screen 98 to ignite booster material 27.

Screen 98 may also be structured to remove particulates from the combustion products. To this end, in one embodiment, screen 98 has a porous structure (such as a metallic mesh, for example) providing numerous tortuous pathways extending throughout the body and between the first and second sides of the screen, to enable trapping of particulates within the body of the screen.

Screen 98 is also axially movable within the housing responsive to forces exerted by resilient member 58. This enables the resilient member to bias the screen 98 against the booster material 27 while permitting the amount of booster material to be varied according to the requirements of a particular application.

If desired, screen 98 may be dimensioned so as to contact an inner surface of housing wall 12c or to engage the inner wall surface in a slight interference fit, to aid in minimizing a flow of generated gases and combustion products around a periphery of the screen, between the screen and the wall inner surface.

Referring again to FIGS. 1-4, a quantity of a known or suitable ignition or booster compound 27, whose combustion ignites gas generant material 28, may be positioned within housing 12 so as to enable fluid communication with gas generant 28. In one embodiment, booster material 27 is a known auto-igniting booster material positioned in housing 12 so as to enable thermal communication with the housing, thereby enabling heat transfer from an exterior of the housing to the auto-igniting booster material using the housing as a heat transfer medium. Alternatively, the auto-igniting booster material may be positioned in housing 12 so as to enable thermal communication with an exterior of the housing, to enable heat transfer from the exterior of the housing to the auto-igniting booster material using a heat-transfer medium other than the housing.

An auto ignition material (not shown) may be positioned in housing 12 so as to enable thermal communication with the housing, thereby enabling heat transfer from an exterior of the housing to the auto ignition material using the housing as a heat transfer medium. Alternatively, the auto ignition material may be positioned in housing 12 so as to enable thermal communication with an exterior of the housing to enable heat transfer from the exterior of the housing to the auto ignition material using a heat-transfer medium other than the housing. The auto-ignition material ignites responsive to heat transmitted thereto from an exterior of the housing, and facilitates ignition of a booster and/or gas generant material positioned in the housing, in a manner known in the art.

In the embodiments shown in FIGS. 1-4, a screen 99 is positioned between booster material 27 and gas generant 28. Screen 99 has a first side or face 99a, a second side or lace 99b opposite the first side 99a, and a body 99c between the first and second sides 99a and 99b. Screen 99 is structured to enable fluid communication between the first and second sides of the screen. This structure enables products of combustion of booster material 27 to pass through screen 99, to ignite gas generant 28. Screen 99 may also be structured to remove particulates from the booster material combustion products. To this end, in one embodiment, screen 99 has a porous structure (such as a metallic mesh, for example) providing numerous tortuous pathways extending throughout the body and between the first and second sides of the screen, to enable trapping of particulates within the body of the screen.

Screen 99 is also axially movable within the housing responsive to forces exerted by resilient member 58. This enables the resilient member to bias screen 98, booster material 27, and screen 99 against gas generant material 28, while permitting the amount of gas generant material to be varied according to the requirements of a particular application.

If desired, screen 99 may be dimensioned so as to contact an inner surface of housing wall 12c or to engage the inner wall surface in a slight interference fit, to aid in minimizing a flow of generated gases and combustion products around a periphery of the screen, between the screen and the wall inner surface.

Referring again to FIGS. 1-4, gas generant material 28 is arranged longitudinally along a portion of the housing interior. In the embodiments shown in FIGS. 2 and 4, the gas generant material arrangement abuts screen 98 at one end and another filter or screen 62 at an opposite end. In the embodiments shown in FIGS. 1 and 3, the gas generant material arrangement abuts screen 98 at one end and a diffuser member 103 (described below) at an opposite end.

In one embodiment, the gas generant material is in the form of blocks formed from a high gas-yield, low solids-producing gas generant composition, such as a "smokeless" gas generant composition. Such gas generant compositions are exemplified by, but not limited to, compositions and processes described in U.S. Pat. Nos. 6,210,505, and 5,872,329, each incorporated by reference herein. As used herein, the term "smokeless" should be generally understood to mean such propellants as are capable of combustion yielding within a range of about 60% to about 80% gaseous products, based on a total product mass; and, as a corollary, no more than about 15% solid products and, preferably, about 10% solid products, based on a total product mass. U.S. Pat. No. 6,210,505 discloses various high nitrogen nonazide gas compositions comprising a nonmetal salt of triazole or tetrazole fuel, phase stabilized ammonium nitrate (PSAN) as a primary oxidizer, a metallic second oxidizer, and an inert component such as clay or mica. U.S. Pat. No. 5,872,329 discloses various high nitrogen nonazide gas compositions comprising an amine salt of triazole or tetrazole fuel, and phase stabilized ammonium nitrate (PSAN) as an oxidizer. Other types of gas generant materials may also be used, according to the requirements of a particular application.

In a particular embodiment, the gas generant material itself is auto-ignitable responsive to exposure to sufficient amount of heat transmitted from an exterior of the housing through housing 12 to the gas generant. This heat would be generated on the exterior of the housing by, for example, a fire or flame impinging on the housing. Use of an auto-ignitable gas generant material eliminates the need for a separate auto-ignition material in the housing. U.S. patent application Ser. No. 12/456,557 (filing date Jun. 18, 2009) and U.S. Ser. No. 12/384,563 (filing date Apr. 7, 2009), both incorporated herein by reference in their entireties, describe examples of gas generant materials with auto-ignition functions incorporated therein. In a particular embodiment, the main gas generant 28 comprises the same auto-igniting material used for the auto-igniting booster material 27.

In one exemplary auto-ignitable gas generant formulation, as described in U.S. patent application Ser. No. 12/384,563, a composition containing about 30 wt % of 5-aminotetrazole, about 10 wt % of potassium 5-aminotetrazole, about 5 wt % of molybdenum trioxide, about 55 wt % of potassium nitrate (provided in approximately stoichiometric amounts calculated to oxidize 5-aminotetrazole and potassium 5-aminotetrazole) was formed by granulating each constituent to a desired size, in a known manner, and then blending and mixing each constituent to form a homogeneous composition. Each composition was then pelletized to form gas generating pellets as known in the art. The constituents are provided as a weight percent of the total composition. Hot plate tests, to determine hot plate ignition temperatures, were conducted by providing an aluminum plate approximately six inches in diameter and about 0.5 inches thick. A recessed portion was created in the middle portion of the aluminum plate. A thermocouple was embedded in the aluminum plate to determine the temperature and temperature differential. For each test conducted, a 250 mg sample was placed in the recess and the aluminum plate was heated at about 40 C per minute. The hot plate ignition temperature of this composition was determined to be 183 C. When heat aged at 107 C for 400 hours, the hot plate ignition temperature was determined to be 185 C, and mass loss was 0.3 wt %, indicative of high thermal stability. The term "ignition" means thermal ignition resulting in combustion as differentiated from decomposition. Combustion is seen as spontaneous light-emitting immediate conflagration with the resultant ash. As referred to throughout this description; hot plate ignition temperatures were determined in the same way as described herein.

In another formulation, a composition containing about 6 wt % of 5-aminotetrazole and about 16 wt % of dinitrobenzoic acid, about 16 wt % of potassium 5-aminotetrazole, about 5 wt % of molybdenum trioxide, about 57 wt % of potassium nitrate was formed as described above. The constituents are provided as a weight percent of the total composition. The hot plate ignition temperature was determined to be 184 C. When heat aged at 107 C for 400 hours, the hot plate ignition temperature was determined to be 185 C, and mass loss was 0.26 wt %.

In yet another formulation, a composition containing about 16 wt % of 5-aminotetrazole, about 26 wt % of potassium 5-aminotetrazole, about 5 wt % of molybdenum trioxide, about 53 wt % of potassium nitrate was formed as described above. The constituents are provided as a weight percent of the total composition. The hot plate ignition temperature was determined to be 187 C. When heat aged at 107 C for 400 hours, the hot plate ignition temperature was determined to be 187 C, and mass loss was 0.05 wt %.

In yet another formulation, a composition containing about 20 wt % of dinitrobenzoic acid, about 20 wt % of potassium 5-aminotetrazole, about 5 wt % of molybdenum trioxide, about 55 wt % of potassium nitrate was formed as described above. The constituents are provided as a weight percent of the total composition. The hot plate ignition temperature was determined to be 187 C. When heat aged at 107 C for 400 hours, the hot plate ignition temperature was determined to be 188 C, and mass loss was 0.4 wt %.

In yet another formulation, a composition containing about 5 wt % of 5-aminotetrazole and about 16 wt % of nitroisophthalic acid, about 16 wt % of potassium 5-aminotetrazole, about 5 wt % of molybdenum trioxide, about 58 wt % of potassium nitrate was formed as described above. The constituents are provided as a weight percent of the total composition. The hot plate ignition temperature was determined to be 181 C. When heat aged at 107 C for 400 hours, the hot plate ignition temperature was determined to be 183 C, and mass loss was 0.2 wt %.

In yet another formulation, a composition containing about 5 wt % of dinitrobenzamide and about 15 wt % of dinitrobenzoic acid, about 20 wt % of potassium 5-aminotetrazole, about 5 wt % of molybdenum trioxide, about 55 wt % of potassium nitrate was formed as described above. The constituents are provided as a weight percent of the total composition. The hot plate ignition temperature was determined to be 181 C. When heat aged at 107 C for 400 hours, the hot plate ignition temperature was determined to be 180 C, and mass loss was 0.6 wt %.

In yet another formulation, a composition containing about 20 wt % of dinitrobenzoic acid, about 20 wt % of potassium 5-aminotetrazole, about 7 wt % of molybdenum trioxide, about 53 wt % of potassium nitrate was formed described above. The constituents are provided as a weight percent of the total composition. The hot plate ignition temperature was determined to be 186 C.

In yet another formulation, a composition containing about 18 wt % of dinitrobenzoic acid, about 21 wt % of potassium 5-aminotetrazole, about 7 wt % of molybdenum trioxide, about 54 wt % of potassium nitrate was formed as described above. The constituents are provided as a weight percent of the total composition. The hot plate ignition temperature was determined to be 187 C.

In yet another formulation, a composition containing about 20 wt % of dinitrobenzoic acid, about 20 wt % of potassium 5-aminotetrazole, about 9 wt % of molybdenum trioxide, about 51 wt % of potassium nitrate was formed as described above. The constituents are provided as a weight percent of the total composition. The hot plate ignition temperature was determined to be 186 C.

In yet another formulation, a composition containing about 20 wt % of 5-aminotetrazole and about 16 wt % of dinitrobenzoic acid, about 16 wt % of potassium 5-aminotetrazole, about 5 wt % of molybdenum trioxide, about 57 wt % of potassium nitrate was formed as described above. The constituents are provided as a weight percent of the total composition. The hot plate ignition temperature was determined to be 184 C.

Other compositions described in the above-mentioned references, as well as compositions not described in these references, may also be used in embodiments of the present invention. In addition, the gas generant material may be provided in any suitable form other than blocks, for example, pellets, tablets, etc., according to the requirements of a particular application The auto-igniting gas generant material may be positioned in housing 12 so as to enable thermal communication with the housing, thereby enabling heat transfer from an exterior of the housing to the auto-igniting gas generant material using the housing as a heat transfer medium. Alternatively, the auto-igniting gas generant material may be positioned in housing 12 so as to enable thermal communication with an exterior of the housing so as to enable heat transfer from the exterior of the housing to the auto-igniting gas generant material using a heat-transfer medium other than the housing. Combustion of the auto-ignition and booster materials results in combustion of the gas generant, in a manner known in the art.

In the embodiments shown in FIGS. 2 and 4, a filter 62 is positioned within housing 12 for filtering particulates from gases generated by combustion of gas generant 28 and/or for cooling the generated gases. Filter 62 is positioned along a flow path of generated gases from combustion chamber 12g to gas exit openings 190a.

Filter 62 may be generally configured to conform to the shape of the housing cavity in which it is positioned, and may be formed from any of a variety of materials (for example, a carbon fiber, metallic mesh, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

In the embodiments shown in FIGS. 1 and 3, a diffuser member 103 is positioned within housing 12 between gas generant 28 and a housing nozzle 190 (described below). Diffuser member 103 includes one or more openings 103a which aid in channeling and distributing a flow of products of combustion of gas generant 28 into the interior of nozzle 190, for distribution by the nozzle to an exterior of the gas generating system. The structure of diffuser member 103 (including the configurations of openings 103) may be arranged so as to, for example, facilitate a desired flow distribution of combustion products into the nozzle interior, or aid in controlling a flow rate of combustion products into the nozzle interior. Diffuser member 103 may be formed from any suitable material, for example a metallic material.

Optionally, in any or all of the embodiments shown in FIGS. 1-4, a rupturable, fluid-tight seal or shim 170 may be positioned between filter 62 and gas exit orifice(s) 190a formed in nozzle 190, or between diffuser member 103 and gas exit orifice(s) 190a. Seal 170 aids in preventing migration of moisture into the portion of the housing interior containing the gas generant 28 and any booster and/or auto-ignition materials. This aids in preventing degradation or contamination of the combustible materials prior to activation of the gas generating system.

Optionally, in any or all of the embodiments shown in FIGS. 1-4, the seal 170 is secured to portions of nozzle 190 and extends across a portion of the nozzle so as to provide a substantially fluid-tight barrier between gas exit orifices 190a and the interior of housing 12. However, the seal 170 may be mounted to any suitable surface or surfaces. Various known disks, foils, films, tapes, or other suitable materials may be used to form the seal.

Nozzle 190 is formed or secured at housing second end 12b and contains one or more gas exit orifices 190a for enabling fluid communication between an interior of the housing and an associated inflatable device (for example, an airbag or a safety belt pretensioner incorporated into a vehicle occupant protection system.). Nozzle 190 directs generated gases from the housing interior into the associated inflatable device. Nozzle 190 may be formed separately from housing 12 and may be attached to housing second end 12b by welding, adhesive attachment, threaded engagement, crimping or any other suitable means, depending on the materials from which the housing and nozzle are formed, the operational requirements of a particular application, and other pertinent factors. The nozzle 190 is attached to housing 12 so as to form a substantially gas-tight seal between the nozzle and the housing. Nozzle 190 may be forged, machined, molded or otherwise formed from a metallic material, a polymer material, or any other suitable material depending on the requirements of a particular application. Orifice(s) 190a may be drilled, punched, molded into the part, or otherwise suitably formed. Alternatively, nozzle 190 may be formed integrally with the remainder of housing 12.

In the embodiment shown in FIGS. 1-4, nozzle 190 is drawn or otherwise formed into a hollow, tubular configuration and includes multiple gas exit orifices 190a arranged so as to direct the generated gases in multiple directions as the gases exit the gas generating system. However, nozzle 190 may have any of a variety of suitable alternative configurations and may include any desired number of orifices 190a positioned in any configuration suitable for a given application.

In the embodiments shown in FIGS. 3 and 4, a thermally-insulating sleeve 189 is positioned between gas generant material 28 and housing 12 to enclose the gas generant material 28. Sleeve 189 insulates the gas generant from housing 12 to aid in impeding or preventing heat transfer from an exterior of the housing to the gas generant via the housing. Sleeve 189 may be formed from any suitable thermally-insulating material or materials, for example, a polymer or a ceramic material. Sleeve may be formed as a single piece of in a plurality of pieces attached or otherwise suitably coupled together.

Referring now to FIG. 5, any of the gas generating system embodiments described herein may be incorporated into an airbag system 200. Airbag system 200 includes at least one airbag 202 and a gas generating system 10 as described herein coupled to airbag 202 so as to enable fluid communication with an interior of the airbag. Airbag system 200 may also be in communication with a crash event sensor 210 operating in association with a known crash sensor algorithm that signals actuation of airbag system 200 via, for example, activation of airbag gas generating system 10 in the event of a collision.

Referring again to FIG. 5, airbag system 200 may also be incorporated into a broader, more comprehensive vehicle occupant protection system 180 including additional elements such as a safety belt assembly 150. FIG. 5 shows a schematic diagram of one exemplary embodiment of such a protection system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of suitable pretensioners are described in U.S. Pat. Nos. 6,505,790 and 6,419,177, incorporated herein by reference.

Safety belt system 150 may also be in communication with a crash event sensor 158 (for example, an inertia sensor or an accelerometer) operating in association with a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system assembly comprising:
   a housing;
   a quantity of gas generant material positioned within the housing;
   a quantity of booster material positioned in the housing spaced apart from the gas generant;
   a movable first screen positioned in the housing such that the booster material is on a first side of the screen and the gas generant material is on a second side of the screen opposite the first side, the first screen being structured to enable fluid communication between the first and second sides of the screen, and
   a movable second screen positioned to physically contact the quantity of booster material opposite the movable first screen.

2. The system of claim 1 wherein a portion of the housing defines a combustion chamber for the quantity of gas generant material, wherein the housing includes at least one gas exit opening structured to enable fluid communication between an interior of the housing and an exterior of the housing, and wherein the system further comprises a filter positioned along a flow path of generated gases from the combustion chamber to the gas exit openings.

3. The system of claim 1 further comprising a thermally-insulating sleeve positioned between the gas generant material and the housing so as to enclose the gas generant material within the sleeve.

4. The system of claim 2 further comprising a thermally-insulating sleeve positioned between the gas generant material and the housing so as to enclose the gas generant material within the sleeve.

5. The system of claim 1 further comprising a movable second screen positioned spaced apart from the first screen such that the booster material is positioned between the first and second screens, the second screen having a first side and a second side opposite the first side, the screen being structured to enable fluid communication between the first and second sides of the screen.

6. The system of claim 5 wherein the second screen has a body extending between the first and second sides of the screen, and wherein the screen has a porous structure providing a plurality of tortuous pathways extending through the body between the first and second sides of the screen.

7. The system of claim 5 wherein the second screen is dimensioned so as to contact an inner surface of a wall of the housing, to aid in minimizing a flow of generated gases and combustion products around a periphery of the screen, between the screen and the wall inner surface.

8. The system of claim 1 wherein the first screen has a body extending between the first and second sides of the screen, and wherein the screen has a porous structure providing a plurality of tortuous pathways extending through the body between the first and second sides of the screen.

9. The system of claim 1 wherein the first screen is dimensioned so as to contact an inner surface of a wall of the housing, to aid in minimizing a flow of generated gases and combustion products around a periphery of the screen, between the screen and the wall inner surface.

10. The system of claim 1 further comprising a resilient member positioned within the housing and configured to bias the second screen against the booster material.

11. The system of claim 10 wherein the resilient member comprises a coil spring.

12. The system of claim 10 further comprising an initiator secured in the housing so as to enable fluid communication with the resilient member, and wherein the resilient member is structured to enable fluid communication between the initiator and the second screen.

13. The system of claim 1 wherein the booster material is an auto-igniting booster material.

14. The system of claim 13 wherein the booster material is positioned within the housing so as to be in thermal communication with the housing.

15. An airbag system comprising a gas generating system in accordance with claim 1.

16. A vehicle occupant protection system comprising a gas generating system in accordance with claim 1.

17. A gas generating system assembly comprising:
    a housing;
    a quantity of gas generant material positioned within the housing;
    a thermally-insulating sleeve enclosing the gas generant material therein;
    a movable first screen biased against the gas generant material, the first screen being structured to enable fluid communication therethrough;
    a quantity of booster material biased against the first screen opposite the gas generant material, and
    a movable second screen biased against the booster material opposite the movable first screen.

18. The system of claim 17 wherein a portion of the housing defines a combustion chamber for the quantity of gas generant material, wherein the housing includes at least one gas exit opening structured to enable fluid communication between an interior of the housing and an exterior of the housing after activation of the gas generating system, and wherein the system further comprises a filter positioned along a flow path of generated gases from the combustion chamber to the gas exit openings.

19. An airbag system comprising a gas generating system in accordance with claim 17.

20. A vehicle occupant protection system comprising a gas generating system in accordance with claim 17.

* * * * *

UNITED STATES PATENT AND TRADEMARK OFFICE
CERTIFICATE OF CORRECTION

PATENT NO. : 9,051,226 B2  
APPLICATION NO. : 13/304302  
DATED : June 9, 2015  
INVENTOR(S) : Mayville et al.

Page 1 of 1

It is certified that error appears in the above-identified patent and that said Letters Patent is hereby corrected as shown below:

In the Specifications:

Column 4; Line 19;   Please delete "lace" and insert --face--.

Signed and Sealed this
Eighteenth Day of August, 2015

Michelle K. Lee
*Director of the United States Patent and Trademark Office*